(12) United States Patent
Hara et al.

(10) Patent No.: US 12,379,255 B2
(45) Date of Patent: Aug. 5, 2025

(54) ELECTROMAGNETIC WAVE SENSOR

(71) Applicant: TDK CORPORATION, Tokyo (JP)

(72) Inventors: Shinji Hara, Tokyo (JP); Naoki Ohta, Tokyo (JP); Susumu Aoki, Tokyo (JP); Eiji Komura, Tokyo (JP); Maiko Shirokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 563 days.

(21) Appl. No.: 17/539,976

(22) Filed: Dec. 1, 2021

(65) Prior Publication Data
US 2022/0178758 A1 Jun. 9, 2022

(30) Foreign Application Priority Data
Dec. 4, 2020 (JP) .................................. 2020-201817

(51) Int. Cl.
*G01J 5/20* (2006.01)
*G01J 5/06* (2022.01)
*G01J 5/00* (2022.01)

(52) U.S. Cl.
CPC . *G01J 5/20* (2013.01); *G01J 5/06* (2013.01); *G01J 2005/0077* (2013.01); *G01J 2005/202* (2013.01); *G01J 2005/204* (2013.01)

(58) Field of Classification Search
CPC ........ G01J 5/20; G01J 5/06; G01J 2005/0077; G01J 2005/202; G01J 2005/204
See application file for complete search history.

(56) References Cited

U.S. PATENT DOCUMENTS

| | | | | |
|---|---|---|---|---|
| 5,021,663 A | * | 6/1991 | Hornbeck | G01J 5/023 250/342 |
| 5,962,854 A | * | 10/1999 | Endo | G01J 5/08 250/349 |
| 7,994,599 B2 | * | 8/2011 | Herrnsdorf | G01J 5/10 257/433 |

(Continued)

FOREIGN PATENT DOCUMENTS

| | | |
|---|---|---|
| JP | 2000-065637 A | 3/2000 |
| JP | 2000-337959 A | 12/2000 |

(Continued)

OTHER PUBLICATIONS

May 17, 2022 Extended Search Report issued in European Patent Application No. 21212012.5.

(Continued)

*Primary Examiner* — Laura Martin
*Assistant Examiner* — Philip L Cotey
(74) *Attorney, Agent, or Firm* — Oliff PLC (57) ABSTRACT

An electromagnetic wave sensor includes a substrate having transmittance of electromagnetic waves having a specific wavelength, an insulator layer provided on one surface side of the substrate, a thermistor film disposed to have a space between the thermistor film and one surface of the substrate, and a wiring part provided inside or on a surface of the insulator layer and electrically connected to the thermistor film, wherein a transmittance of the electromagnetic waves at a portion facing the thermistor film is relatively higher than a transmittance of the electromagnetic waves at a portion where the wiring part is provided in a layer in which the insulator layer is provided.

11 Claims, 9 Drawing Sheets

(56) References Cited

U.S. PATENT DOCUMENTS

| | | | | |
|---|---|---|---|---|
| 2001/0010360 A1* | 8/2001 | Oda | | G01J 5/20 250/353 |
| 2003/0183921 A1* | 10/2003 | Komobuchi | | B81B 7/0077 257/E31.117 |
| 2004/0089807 A1* | 5/2004 | Wada | | G01J 5/20 250/338.1 |
| 2008/0251723 A1* | 10/2008 | Ward | | G01J 5/24 257/E27.128 |
| 2011/0024860 A1* | 2/2011 | Herrnsdorf | | G01J 5/10 257/433 |
| 2011/0155914 A1* | 6/2011 | Ohhira | | G01J 5/0815 250/338.4 |
| 2012/0307030 A1* | 12/2012 | Blanquart | | H10F 39/018 348/76 |
| 2013/0284885 A1* | 10/2013 | Chen | | H10F 39/811 250/208.1 |
| 2014/0061845 A1* | 3/2014 | Purkl | | G01J 5/024 438/54 |
| 2015/0115160 A1* | 4/2015 | O'Brien | | B81B 7/02 29/832 |
| 2016/0178444 A1* | 6/2016 | Oulachgar | | G01J 3/36 250/349 |
| 2020/0408604 A1* | 12/2020 | Ohta | | H10F 39/184 |
| 2021/0199509 A1* | 7/2021 | Aliane | | G01J 5/20 |
| 2021/0347636 A1* | 11/2021 | Becker | | G01J 5/024 |

FOREIGN PATENT DOCUMENTS

| | | |
|---|---|---|
| JP | 2003-337066 A | 11/2003 |
| JP | 2007-309877 A | 11/2007 |
| JP | 2008-039570 A | 2/2008 |
| JP | 2010-127892 A | 6/2010 |
| JP | 2013-152115 A | 8/2013 |
| WO | 2007/000172 A1 | 1/2007 |
| WO | 2019/171488 A1 | 9/2019 |

OTHER PUBLICATIONS

English Translation of Apr. 25, 2025 Office Action issued in Chinese Patent Application No. 202111453388.7.

* cited by examiner

ELECTROMAGNETIC WAVE SENSOR

BACKGROUND

The present disclosure relates to an electromagnetic wave sensor.

Priority is claimed on Japanese Patent Application No. 2020-201817, filed on Dec. 4, 2020 the content of which are incorporated herein by reference.

DESCRIPTION OF RELATED ART

For example, there is an electromagnetic wave sensor using a thermistor element. The electrical resistance of a thermistor film included in a thermistor element changes according to change in temperature of the thermistor film. In an electromagnetic wave sensor, infrared rays (electromagnetic waves) incident on a thermistor film are absorbed by the thermistor film or materials around the thermistor film, and thereby a temperature of the thermistor film changes. Thereby, the thermistor element detects the infrared rays (electromagnetic waves).

Here, according to the Stefan-Boltzmann law, there is a correlation between a temperature of a measurement target and infrared rays (radiant heat) emitted from the measurement target by thermal radiation. Therefore, when infrared rays emitted from a measurement target are detected using a thermistor element, a temperature of the measurement target can be measured in a non-contact manner.

Also, such a thermistor element is applied to an electromagnetic wave sensor such as an infrared imaging element (infrared image sensor) that detects (images) a temperature distribution of a measurement target two-dimensionally by disposing a plurality of thermistor elements in an array (see, for example, Patent Document 1 below).

PATENT DOCUMENTS

[Patent Document 1] PCT International Publication No. WO 2019/171488

SUMMARY

Incidentally, in the electromagnetic wave sensor described above, in order to improve the accuracy of detection of infrared rays (electromagnetic waves) by the thermistor element, absorption of infrared rays by portions other than the thermistor film until the infrared rays emitted from a measurement target are incident on the thermistor film is required to be suppressed as far as possible.

It is desirable to provide an electromagnetic wave sensor in which an accuracy of detection of electromagnetic waves by a thermistor element is improved.

The following means are provided.

An electromagnetic wave sensor including a substrate having transmittance with respect to electromagnetic waves having a specific wavelength, an insulator layer provided on one surface side of the substrate, a thermistor film disposed to have a space between the thermistor film and one surface of the substrate, and a wiring part provided inside or on a surface of the insulator layer and electrically connected to the thermistor film, wherein a transmittance of the electromagnetic waves at a portion facing the thermistor film is relatively higher than a transmittance of the electromagnetic waves at a portion where the wiring pan is provided in a layer in which the insulator layer is provided.

An electromagnetic wave sensor including a substrate having transmittance with respect to electromagnetic waves of a specific wavelength, an insulator layer provided on one surface side of the substrate, a thermistor film disposed to have a space between the thermistor film and one surface of the substrate, and a wiring part provided inside or on a surface of the insulator layer and electrically connected to the thermistor film, wherein a hole penetrating the insulator layer or a recessed part in which the insulator layer is recessed is provided between the substrate and the thermistor film.

According to the present disclosure, an electromagnetic wave sensor in which the accuracy of detection of electromagnetic waves by a thermistor element is improved can be provided.

DETAILED DESCRIPTION

Hereinafter, an embodiment of the present disclosure will be described in detail with reference to the drawings.

In the drawings used in the following description, in order to make the respective constituent elements easier to see, scales of dimensions may be different depending on the constituent elements, and dimensional proportions and the like between respective constituent elements may not be the same as the actual ones. Also, materials and the like illustrated in the following description are merely examples, and the present disclosure is not necessarily limited thereto and can be implemented with appropriate modifications within a range not changing the gist thereof.

Also, in the drawings illustrated below, an XYZ orthogonal coordinate system is set, in which an X-axis direction is set as a first direction X in a specific plane of an electromagnetic wave sensor, a Y-axis direction is set as a second direction Y perpendicular to the first direction X in the specific plane of the electromagnetic wave sensor, and a Z-axis direction is set as a third direction Z perpendicular to the specific plane of the electromagnetic wave sensor.

First Embodiment

First, as a first embodiment of the present disclosure, for example, an electromagnetic wave sensor 1A illustrated in FIGS. 1 to 4 will be described.

Figure 1:
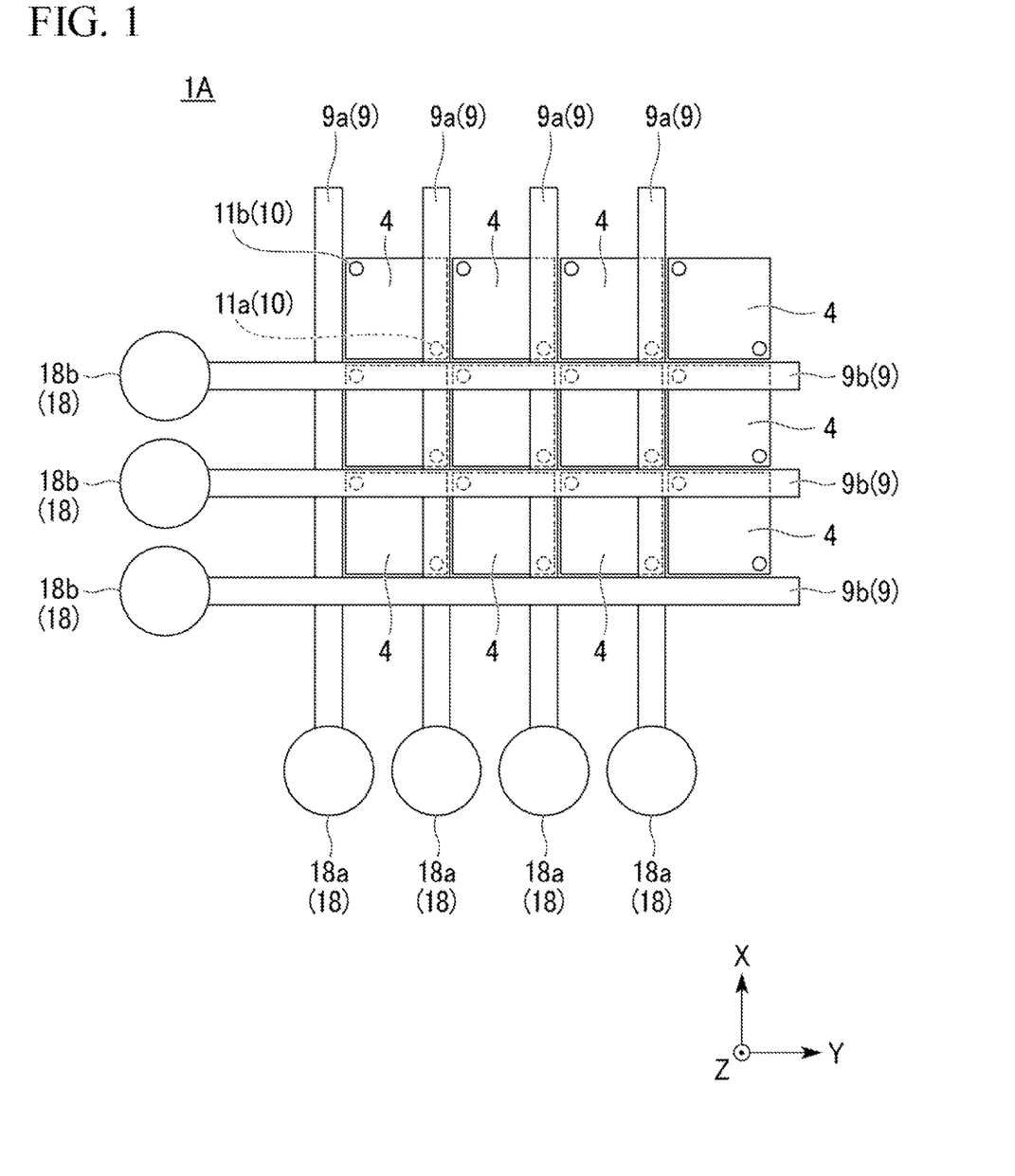
FIG. 1 is a plan view illustrating a configuration of an electromagnetic wave sensor according to a first embodiment of the present disclosure.
Figure 2:
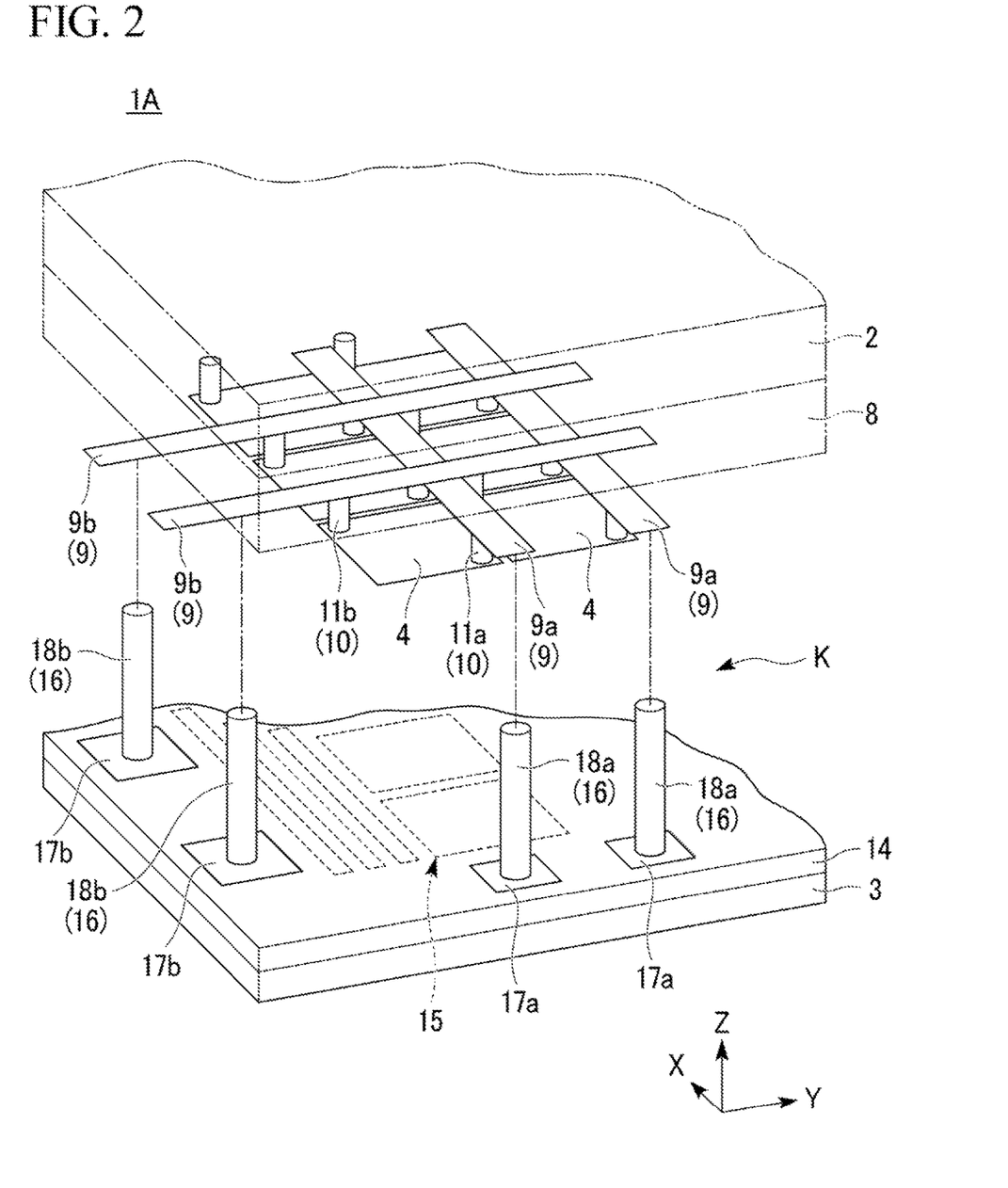
FIG. 2 is an exploded perspective view illustrating the configuration of the electromagnetic wave sensor illustrated in FIG. 1.
Figure 3:
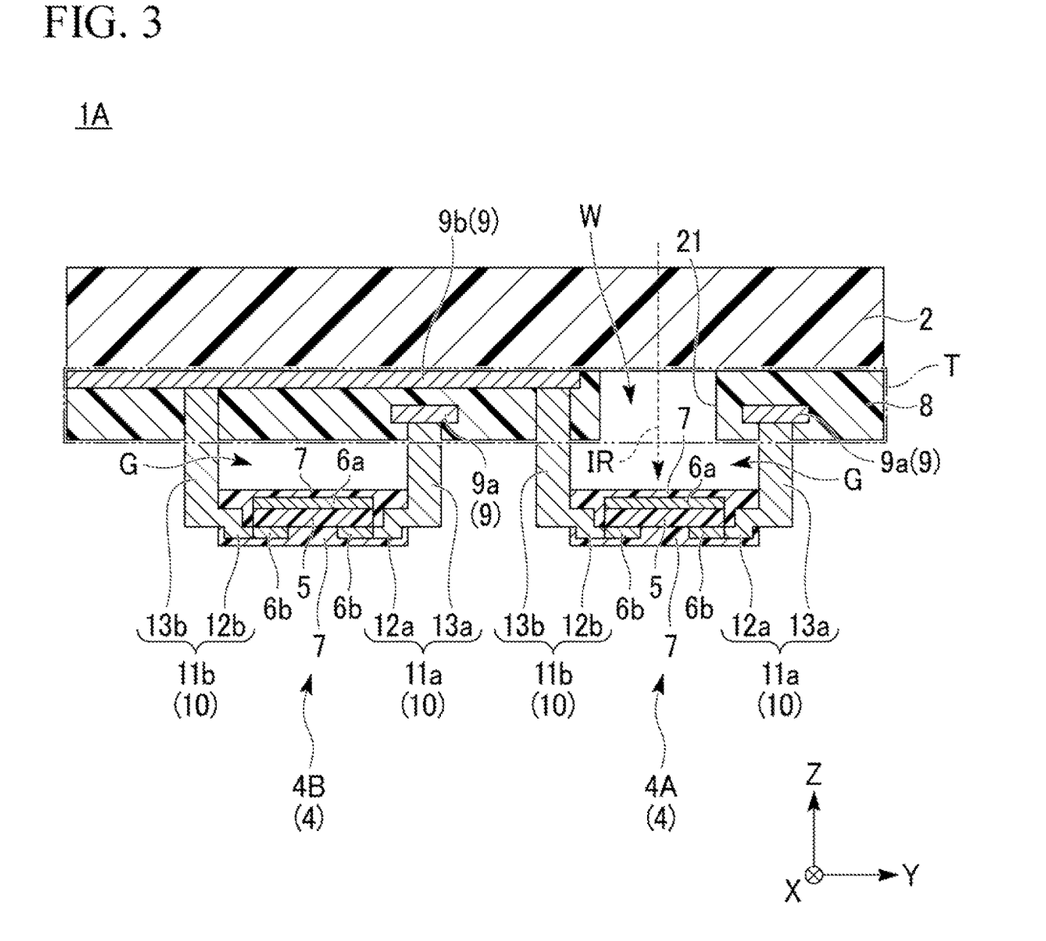
FIG. 3 is a cross-sectional view illustrating a cell structure of the electromagnetic wave sensor illustrated in FIG. 1.
Figure 4:
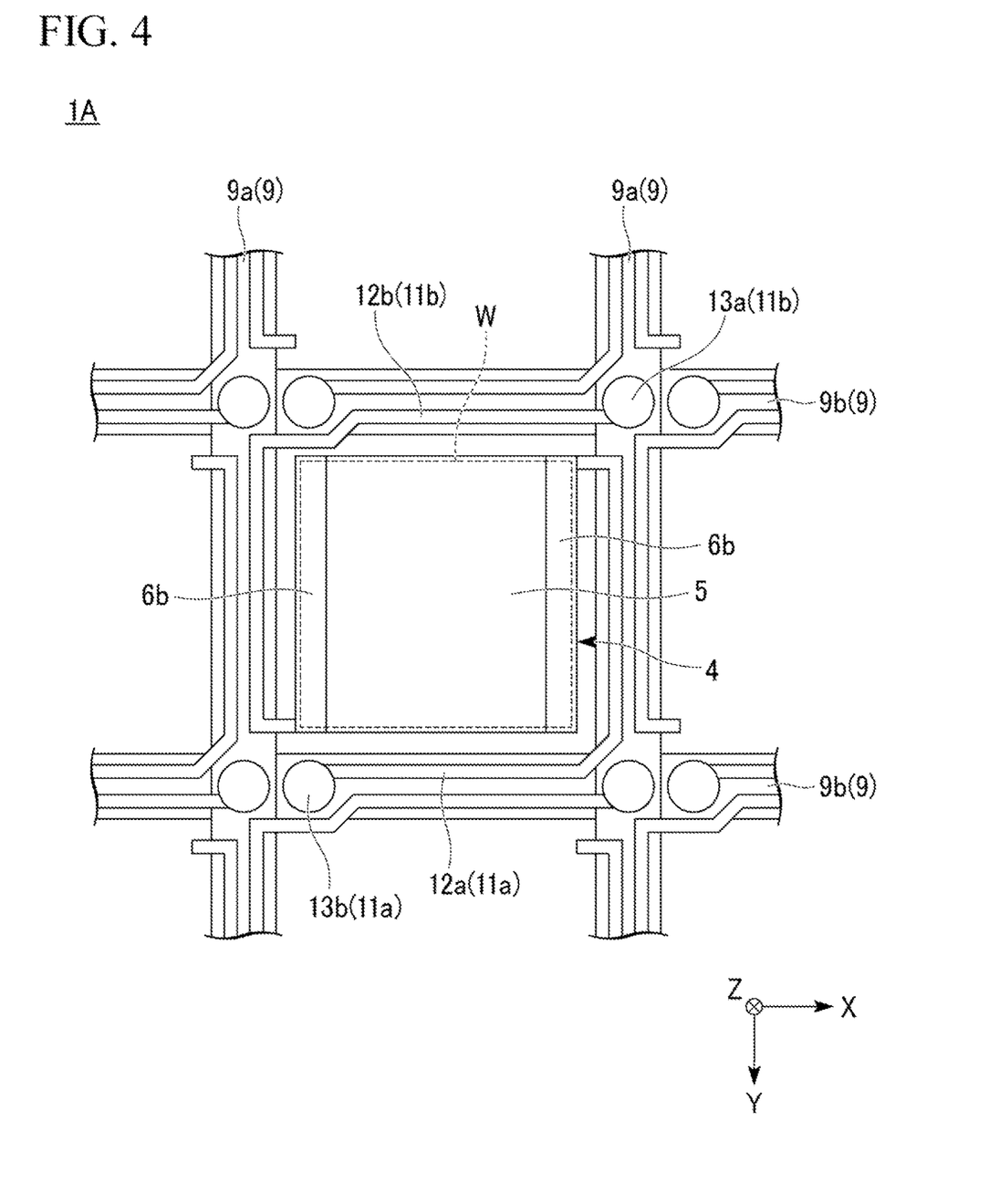
FIG. 4 is a plan view illustrating the cell structure of the electromagnetic wave sensor illustrated in FIG. 1.

FIG. 1 is a plan view illustrating a configuration of the electromagnetic wave sensor 1A. FIG. 2 is a perspective view illustrating the configuration of the electromagnetic wave sensor 1A. FIG. 3 is a cross-sectional view illustrating a cell structure of the electromagnetic wave sensor 1A. FIG. 4 is a plan view illustrating the cell structure of the electromagnetic wave sensor 1A.

The electromagnetic wave sensor 1A of the present embodiment is an application of the present disclosure to an infrared imaging element (infrared image sensor) that detects (images) a temperature distribution of a measurement target two-dimensionally by detecting infrared rays (electromagnetic waves) emitted from the measurement target.

Infrared rays are electromagnetic waves having a wavelength of 0.75 μm or more and 1000 μm or less. An infrared image sensor is used as an infrared camera for indoor or outdoor night vision and is used as a non-contact temperature sensor for measuring a temperature of people or objects.

Specifically, as illustrated in FIGS. 1 to 4, the electromagnetic wave sensor 1A includes a first substrate 2 and a second substrate 3 disposed to face each other, and a plurality of thermistor elements 4 disposed between the first substrate 2 and the second substrate 3.

The first substrate 2 and the second substrate 3 are formed of a silicon substrate having transmittance with respect to electromagnetic waves (long-wavelength infrared rays having a wavelength of 8 to 14 μm in the present embodiment) (hereinafter referred to as "infrared rays") IR having a specific wavelength. Also, as the substrate having transmittance with respect to infrared rays IR, a germanium substrate or the like can be used.

The first substrate 2 and the second substrate 3 form an internal space K therebetween by circumferences of surfaces facing each other being sealed with a sealing material (not illustrated). Also, a pressure of the internal space K is reduced to a high vacuum. Thereby, in the electromagnetic wave sensor 1A, an influence of heat due to convection in the internal space K is reduced, and an influence of heat other than the infrared rays IR emitted from the measurement target on the thermistor elements 4 is reduced.

Further, the electromagnetic wave sensor 1A of the present embodiment is not necessarily limited to the configuration in which the pressure of the above-described sealed internal space K is reduced and may have a configuration in which the internal space K is sealed or open at atmospheric pressure.

The thermistor elements 4 each include the thermistor film 5 that detects infrared rays IR, a first electrode 6a provided in contact with one surface of the thermistor film 5, a pair of second electrodes 6b provided in contact with the other surface of the thermistor film 5, and a dielectric film 7 that covers the thermistor film 5, and has a current-perpendicular-to-plane (CPP) structure in which a current is caused to flow in a direction perpendicular to a plane of the thermistor film 5.

That is, in the thermistor element 4, it is possible to cause a current to flow in the direction perpendicular to the plane of the thermistor film 5 from one of the second electrodes 6b toward the first electrode 6a and cause a current to flow in the direction perpendicular to the plane of the thermistor film 5 from the first electrode 6a toward the other of the second electrodes 6b.

For the thermistor film 5, for example, a vanadium oxide film, amorphous silicon, polycrystalline silicon, an oxide having a spinel-type crystal structure containing manganese, titanium oxide, yttrium-barium-copper oxide, or the like can be used.

As the first electrode 6a and the second electrodes 6b, a conductive film of such as, for example, platinum (Pt), gold (Au), palladium (Pd), ruthenium (Ru), silver (Ag), rhodium (Rh), iridium (Ir), osmium (Os), or the like can be used.

For the dielectric film 7, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The dielectric film 7 may be configured to cover at least some of at least the thermistor film 5. In the present embodiment, the dielectric film 7 is provided to cover both surfaces of the thermistor film 5.

The plurality of thermistor elements 4 have the same size as each other and are each formed in a rectangular shape (square shape in the present embodiment) in a plan view. Also, the plurality of thermistor elements 4 are disposed in an array in a plane parallel to the first substrate 2 and the second substrate 3 (hereinafter, referred to as "in a specific plane"). That is, the plurality of thermistor elements 4 are disposed to be aligned in a matrix in the first direction X and the second direction Y that intersect each other (orthogonally in the present embodiment) in a specific plane.

Also, when the first direction X is referred to as a row direction and the second direction Y is referred to as a column direction, the thermistor elements 4 are disposed to be aligned at regular intervals in the first direction X and disposed to be aligned at regular intervals in the second direction Y.

Further, examples of the size of matrix of the above-described thermistor elements 4 include 640 rows×480 columns and 1024 rows×768 columns, but the size of the matrix is not necessarily limited thereto and can be changed as appropriate.

On the first substrate 2 side, a first insulator layer 8, a wiring part 9 electrically connected to a circuit unit 15 to be described later, and a first connecting part 10 for electrically connecting between each thermistor element 4 and the wiring part 9 are provided.

The first insulator layer 8 is formed of an insulating film laminated on one surface (a surface facing the second substrate 3) side of the first substrate 2. As the insulating film, for example, aluminum nitride, silicon nitride, aluminum oxide, silicon oxide, magnesium oxide, tantalum oxide, niobium oxide, hafnium oxide, zirconium oxide, germanium oxide, yttrium oxide, tungsten oxide, bismuth oxide, calcium oxide, aluminum oxynitride, silicon oxynitride, aluminum magnesium oxide, silicon boride, boron nitride, sialon (oxynitride of silicon and aluminum), or the like can be used.

The wiring part 9 includes a plurality of first lead wirings 9a and a plurality of second lead wirings 9b. The first lead wirings 9a and the second lead wirings 9b are formed of a conductive film such as, for example, copper or gold. The wiring part 9 is provided inside or on a surface of the first insulator layer 8.

The plurality of first lead wirings 9a and the plurality of second lead wirings 9b are positioned in different layers in the third direction Z of the first insulator layer 8 and are disposed to intersect three-dimensionally. Of these, the plurality of first lead wirings 9a extend in the first direction X and are provided to be aligned at regular intervals in the second direction Y. On the other hand, the plurality of second lead wirings 9b extend in the second direction Y and are provided to be aligned at regular intervals in the first direction X.

The thermistor elements 4 are each provided for each region defined by the plurality of first lead wirings 9a and the plurality of second lead wirings 9b in a plan view. In a region facing each thermistor film 5 in a thickness direction of the first substrate 2 (a region overlapping in a plan view), there is a window portion W that allows infrared rays IR to be transmitted between the first substrate 2 and the thermistor film 5.

The first connecting part 10 includes a pair of first connecting members 11a and 11b provided corresponding to each of the plurality of thermistor elements 4. Also, the pair of first connecting members 11a and 11b have a pair of arm parts 12a and 12b and a pair of leg parts 13a and 13b.

The arm parts 12a and 12b are each formed of a bent line-shaped conductor pattern formed along a circumference of the thermistor element 4 using a thin film of such as, for example, titanium or titanium nitride. The leg parts 13a and 13b are each formed of a conductor pillar having a circular cross section formed to extend in the third direction Z using plating of such as, for example, copper, gold, FeCoNi alloy, or NiFe alloy (permalloy).

One first connecting member 11a includes one arm part 12a electrically connected to one second electrode 6b and one leg part 13a for electrically connecting between one arm part 12a and the first lead wiring 9a to electrically connect between one side of the thermistor element 4 and the first lead wiring 9a.

The other first connecting member 11b includes the other arm part 12b electrically connected to the other second electrode 6b and the other leg part 13b for electrically connecting between the other arm part 12b and the second lead wiring 9b to electrically connect between the other side of the thermistor element 4 and the second lead wiring 9b.

Thereby, the thermistor element 4 is supported in a state of being suspended in the third direction Z by the pair of first connecting members 11a and 11b positioned in a diagonal direction in the plane thereof. Also, a space G is provided between the thermistor element 4 and the first insulator layer 8, and the thermistor film 5 is disposed to have the space G between the thermistor film and one surface (a surface facing the second substrate 3) of the first substrate 2.

Although illustration is omitted, a plurality of selection transistors (not illustrated) for selecting one thermistor element 4 from the plurality of thermistor elements 4 are provided on one surface (a surface facing the second substrate 3) side of the first substrate 2. The plurality of selection transistors are provided at positions on the first substrate 2 respectively corresponding to the plurality of thermistor elements 4. Also, the selection transistors are each provided at a position other than the above-described window portion W to prevent diffuse reflection of the infrared rays IR and deterioration in efficiency of incidence.

On the second substrate 3 side, a second insulator layer 14, the circuit unit 15 that detects a change in voltage output from the thermistor element 4 to convert it into a brightness temperature, and a second connecting part 16 for electrically connecting between each thermistor element 4 and the circuit unit 15 are provided.

The second insulator layer 14 is formed of an insulating film laminated on one surface (a surface facing the first substrate 2) side of the second substrate 3. As the insulating film, the same insulating film as that exemplified in the first insulator layer 8 described above can be used.

The circuit unit 15 includes a read out integrated circuit (ROIC), a regulator, an analog-to-digital converter (A/D converter), a multiplexer, and the like and is provided in the second insulator layer 14.

Also, a plurality of connecting terminals 17a and 17b respectively corresponding to the plurality of first lead wirings 9a and the plurality of second lead wirings 9b are provided on a surface of the second insulator layer 14. The connecting terminals 17a and 17b are formed of a conductive film such as, for example, copper or gold.

The connecting terminals 17a on one side are positioned in a region surrounding a circumference of the circuit unit 15 on one side in the first direction X and are provided to be aligned at regular intervals in the second direction Y. The connecting terminals 17b on the other side are positioned in a region surrounding the circumference of the circuit unit 15 on one side in the second direction Y and are provided to be aligned at regular intervals in the first direction X.

The second connecting parts 16 include a plurality of second connecting members 18a and 18b provided corresponding to the plurality of first lead wirings 9a and the plurality of second lead wirings 9b. The plurality of second connecting members 18a and 18b are formed of conductor pillars having a circular cross section formed to extend in the third direction Z by plating such as, for example, copper or gold.

The second connecting members 18a on one side electrically connect one end sides of the first lead wirings 9a and the connecting terminals 17a on one side. The second connecting members 18b on the other side electrically connect one end sides of the second lead wirings 9b and the connecting terminals 17b on the other side. Thereby, the plurality of first lead wirings 9a and the circuit unit 15 are electrically connected via the second connecting members 18a on one side and the connecting terminals 17a on one side. Also, the plurality of second lead wirings 9b and the circuit unit 15 are electrically connected via the second connecting members 18b on the other side and the connecting terminals 17b on the other side.

In the electromagnetic wave sensor 1A of the present embodiment having the above configuration, the infrared rays IR emitted from the measurement target are incident on the thermistor element 4 from the first substrate 2 side through the window portion W.

In the thermistor element 4, a temperature of the thermistor film 5 changes due to absorption of the infrared rays IR incident on the dielectric film 7 formed in the vicinity of the thermistor film 5 by the dielectric film 7 and absorption of the infrared rays IR incident on the thermistor film 5 by the thermistor film 5. Also, in the thermistor element 4, an output voltage between the pair of second electrodes 6b changes due to change in electrical resistance of the thermistor film 5 in response to a temperature change of the thermistor film 5. In the electromagnetic wave sensor 1A of the present embodiment, the thermistor element 4 functions as a bolometer element.

In the electromagnetic wave sensor 1A of the present embodiment, the infrared rays IR emitted from the measurement target are detected in a planar manner by the plurality of thermistor elements 4, then an electric signal (voltage signal) output from each of the thermistor elements 4 is converted into a brightness temperature, and thereby a temperature distribution (temperature image) of the measurement target can be detected (imaged) two-dimensionally.

Further, when a constant voltage is applied to the thermistor film 5, it is also possible for the thermistor element 4 to detect a change in current flowing through the thermistor film 5 in response to a temperature change of the thermistor film 5 and convert it into a brightness temperature.

Incidentally, as illustrated in FIGS. 3 and 4, the electromagnetic wave sensor 1A of the present embodiment has a configuration in which, of the plurality of thermistor elements 4, some reference thermistor elements 4B are disposed in a region on an outer side of a region in which measurement thermistor elements 4A are periodically disposed to be aligned. Alternatively, it may be configured such that some reference thermistor elements 4B may be disposed in a region on an inner side of the region in which the measurement thermistor elements 4A are periodically disposed to be aligned.

In the electromagnetic wave sensor 1A of the present embodiment, a temperature of the measurement target can be accurately detected by reducing an influence of the temperature around the thermistor film 5 by utilizing a difference between a signal detected from the measurement thermistor element 4A and a signal detected from the reference thermistor element 4B.

In the electromagnetic wave sensor 1A of the present embodiment, in the measurement thermistor element 4A, a transmittance with respect to the infrared rays IR at a portion facing the thermistor film 5 is relatively higher than a transmittance with respect to the infrared rays IR at a portion in which the wiring part 9 is provided in a layer T in which the first insulator layer 8 is provided.

Specifically, in the thermistor element 4A, a hole 21 penetrating the first insulator layer 8 is provided in a portion facing the thermistor film 5. In other words, the hole 21 penetrating the first insulator layer 8 is provided between the first substrate 2 and the thermistor film 5. Thereby, a transmittance with respect to the infrared rays IR at a position at which the hole 21 is provided is the highest in the layer T in which the first insulator layer 8 is provided.

The first connecting part 10 includes the leg parts 13a and 13b disposed to extend in a direction of a thickness direction component of the first substrate 2, and the arm parts 12a and 12b disposed at positions not overlapping the thermistor film 5 in a thickness direction of the first substrate 2.

The arm parts 12a and 12b are positioned between the thermistor film 5 and the leg parts 13a and 13b in the first connecting part 10. The leg parts 13a and 13b are positioned between the wiring part 9 and the arm parts 12a and 12b in the first connecting part 10. The first insulator layer 8 is provided between the first substrate 2 and the arm parts 12A and 12b.

Thereby, in the layer T in which the first insulator layer 8 is provided, a transmittance with respect to the infrared rays IR at a portion facing the arm parts 12a and 12b is relatively lower than a transmittance with respect to the infrared rays IR at a portion facing the thermistor film 5. Due to this, a transmittance with respect to the infrared rays IR at a portion facing the thermistor film 5 is the highest in the layer T in which the first insulator layer 8 is provided.

Therefore, in the electromagnetic wave sensor 1A of the present embodiment, absorption of the infrared rays IR by portions other than the thermistor film 5 and its vicinity until the infrared rays IR emitted from the measurement target are incident on the vicinity of the thermistor film 5 from the first substrate 2 side through the window portion W in the measurement thermistor element 4A can be reduced to be low.

Also, in the electromagnetic wave sensor 1A of the present embodiment, in the measurement thermistor element 4A, a transmittance with respect to the infrared rays IR at a portion facing the arm parts 12a and 12b is relatively lower than a transmittance with respect to the infrared rays IR at a portion facing the thermistor film 5 in the layer T in which the first insulator layer 8 is provided. Therefore, the infrared rays IR irradiated to the arm parts 12a and 12b can be suppressed, and an influence of the infrared rays IR irradiated to the arm parts 12a and 12b on the thermistor film 5 can be reduced.

On the other hand, in the reference thermistor element 4B, the first insulator layer 8 is provided between the first substrate 2 and the thermistor film 5. That is, the reference thermistor element 4B has a configuration in which the hole 21 penetrating the first insulator layer 8 described above is not provided in a portion facing the thermistor film 5 in the layer T in which the first insulator layer 8 is provided. Therefore, in the reference thermistor element 4B, the infrared rays IR are absorbed by the first insulator layer 8 until the infrared rays IR emitted from the measurement target are incident on the thermistor film 5 from the first substrate 2 side through the window portion W.

Therefore, in the layer T in which the first insulator layer 8 is provided, a transmittance with respect to the infrared rays IR at a portion facing the thermistor film 5 constituting the measurement thermistor elements 4A is relatively higher than a transmittance with respect to the infrared rays IR at a portion facing the thermistor film 5 constituting the reference thermistor elements 4B.

Thereby, in the electromagnetic wave sensor 1A of the present embodiment, since the infrared rays IR emitted from the measurement target being incident on the thermistor film 5 of the reference thermistor element 4B is suppressed, a temperature of the measurement target can be accurately detected by reducing an influence of the temperature around the thermistor film 5 by utilizing a difference between a signal detected from the measurement thermistor element 4A and a signal detected front the reference thermistor element 4B described above.

As described above, in the electromagnetic wave sensor 1A of the present embodiment, an accuracy of detection of the infrared rays IR by the thermistor element 4A described above can be improved, and a temperature distribution (temperature image) of the measurement target can be detected (imaged) with high accuracy.

Second Embodiment

Next, as a second embodiment of the present disclosure, for example, an electromagnetic wave sensor 1B illustrated in FIG. 5 will be described.

Figure 5:
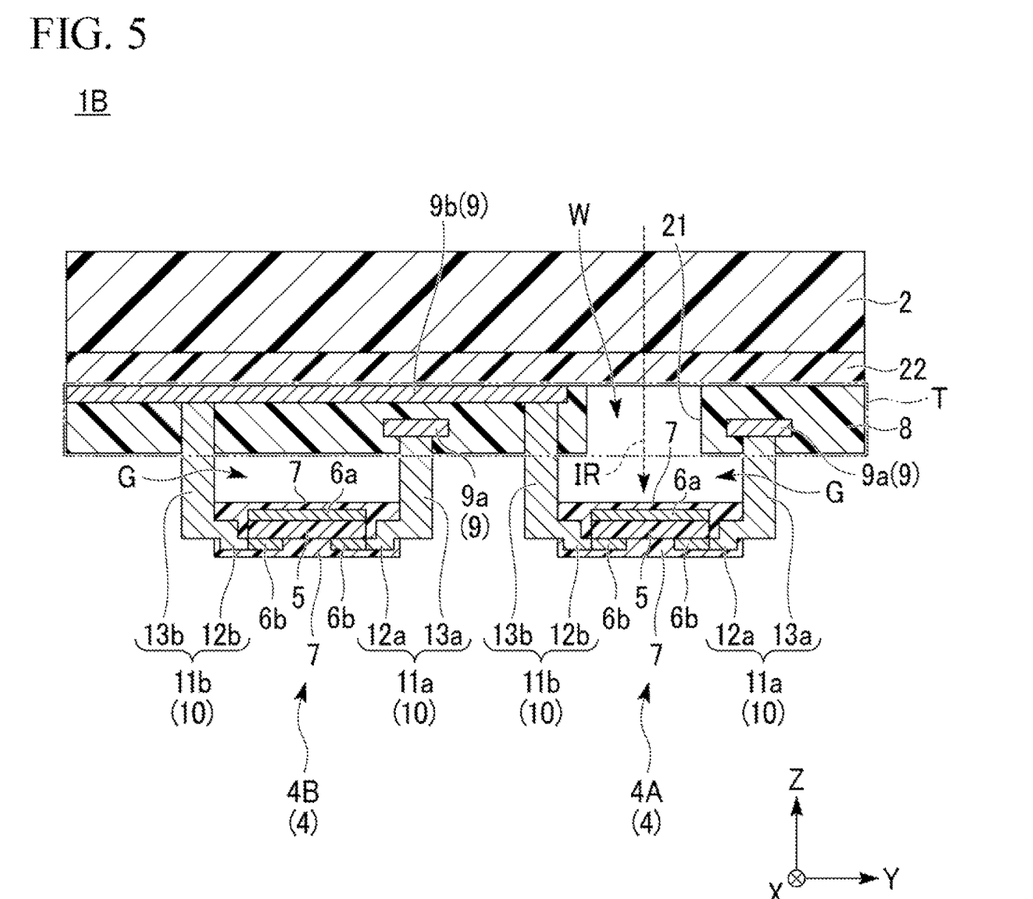
FIG. 5 is a cross-sectional view illustrating a cell structure of an electromagnetic wave sensor according to a second embodiment of the present disclosure.

FIG. 5 is a cross-sectional view illustrating a cell structure of the electromagnetic wave sensor 1B. Also, in the following description, portions the same as those of the above-described electromagnetic wave sensor 1A will be omitted in description and will be denoted by the same reference signs in the drawings.

As illustrated in FIG. 5, the electromagnetic wave sensor 1B of the present embodiment has a configuration in which an antireflection film 22 is provided between a first substrate 2 and a first insulator layer 8. Configurations other than that are basically the same as those of the electromagnetic wave sensor 1A described above.

The antireflection film 22 is one for allowing infrared rays IR transmitted through the first substrate 2 to be efficiently incident on the thermistor film 5 side by preventing the infrared rays IR from being reflected at an interface between the first substrate 2 and a space G until the infrared rays IR emitted from a measurement target are incident on a thermistor film 5 from the first substrate 2 side through a window portion W.

As the antireflection film 22, for example, zinc sulfide, yttrium fluoride, chalcogenide glass, germanium, silicon, zinc selenide, gallium arsenide, or the like can be used.

Also, the antireflection film 22 may have a configuration in which films having different refractive indexes are alternately laminated so that a reflectance of the infrared rays IR is reduced by utilizing interference of waves reflected by each layer. In this case, as the antireflection film 22, in addition to the above-described materials, a laminated film in which, for example, an oxide film, a nitride film, a sulfide film, a fluoride film, a boride film, a bromide film, a chloride film, a selenide film, a Ge film, a diamond film, a chalcogenide film, a Si film, or the like is laminated can be used.

In the electromagnetic wave sensor 1B of the present embodiment, similarly to the electromagnetic wave sensor 1A, a hole 21 penetrating the first insulator layer 8 is provided in a portion facing the thermistor film 5 in a measurement thermistor element 4A. That is, a transmittance with respect to the infrared rays IR at a position at which the hole 21 is provided is the highest in a layer T in which the first insulator layer 8 is provided.

Thereby, in the measurement thermistor element 4A, a transmittance with respect to the infrared rays IR at a portion facing the thermistor film 5 is relatively higher than a transmittance with respect to the infrared rays IR at a portion in which a wiring part 9 is provided in the layer T in which the first insulator layer 8 is provided.

Therefore, in the electromagnetic wave sensor 1B of the present embodiment, absorption of the infrared rays IR by portions other than the thermistor film 5 and its vicinity until the infrared rays 1R emitted from the measurement target are incident on the vicinity of the thermistor film 5 from the first substrate 2 side through the window portion W in the measurement thermistor element 4A can be reduced to be low.

Therefore, in the electromagnetic wave sensor 1B of the present embodiment, even when the antireflection film 22 is provided between the first substrate 2 and the first insulator layer 8, absorption of the infrared rays IR by portions other than the thermistor film 5 and its vicinity until the infrared rays IR emitted from the measurement target are incident on the vicinity of the thermistor film 5 in the measurement thermistor element 4A can be reduced to be low.

As described above, in the electromagnetic wave sensor 1B of the present embodiment, an accuracy of detection of the infrared rays IR by the thermistor element 4A described above can be improved, and a temperature distribution (temperature image) of the measurement target can be detected (imaged) with high accuracy.

Incidentally, the hole 21 penetrating the first insulator layer 8 is provided in the electromagnetic wave sensor 1A of the first embodiment and the electromagnetic wave sensor 1B of the second embodiment. In a case of such a configuration, the first insulator layer 8 may be formed of a laminated film of a silicon oxide film 8a and an aluminum oxide film 8b provided between the first substrate 2 and the silicon oxide film 8a.

Here, steps of forming the hole 21 in the first insulator layer 8 will be described with reference to FIGS. 6 to 9.

FIGS. 6 to 9 are cross-sectional views for sequentially explaining the steps of forming the hole 21 in the first insulator layer 8. Here, the electromagnetic wave sensor 1B of the second embodiment will be described as an example.

Figure 6:
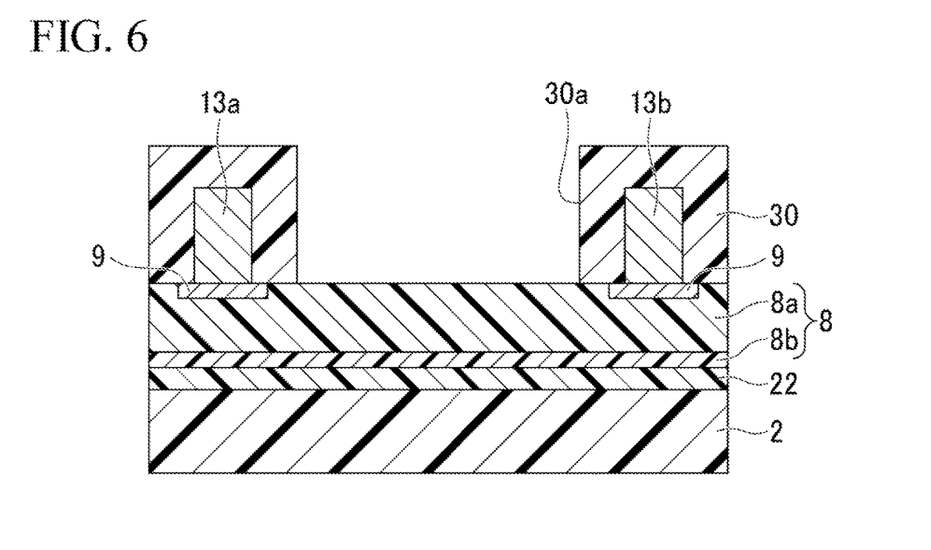
FIG. 6 is a cross-sectional view for sequentially explaining steps of forming a hole in a first insulator layer.

When the hole 21 is formed in the first insulator layer 8, first, as illustrated in FIG. 6, the antireflection film 22, and the aluminum oxide film 8b and the silicon oxide film 8a constituting the first insulator layer 8 are sequentially laminated and formed on one surface of the first substrate 2. Also, a mask layer 30 having an opening 30a is formed on a surface of the first insulator layer 8 at a position corresponding to the hole 21. The mask layer 30 is made of a photoresist.

Figure 7:
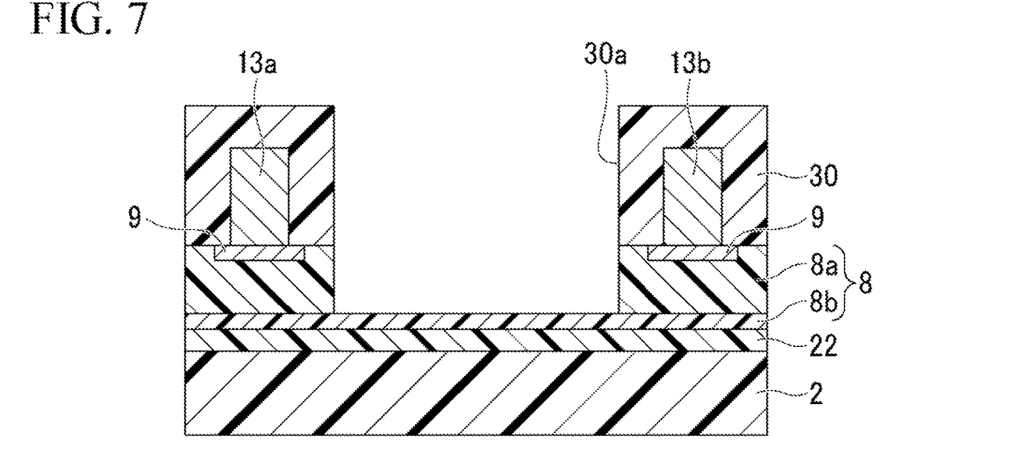
FIG. 7 is a cross-sectional view for sequentially explaining steps of forming the hole in the first insulator layer.

Next, as illustrated in FIG. 7, reactive ion etching (RIE) using a chlorine-based gas is performed. At this time, using the aluminum oxide film 8b as an etching stopper, the silicon oxide film 8a is removed while being patterned in a shape corresponding to the opening 30a until the aluminum oxide film 8b is exposed.

Figure 8:
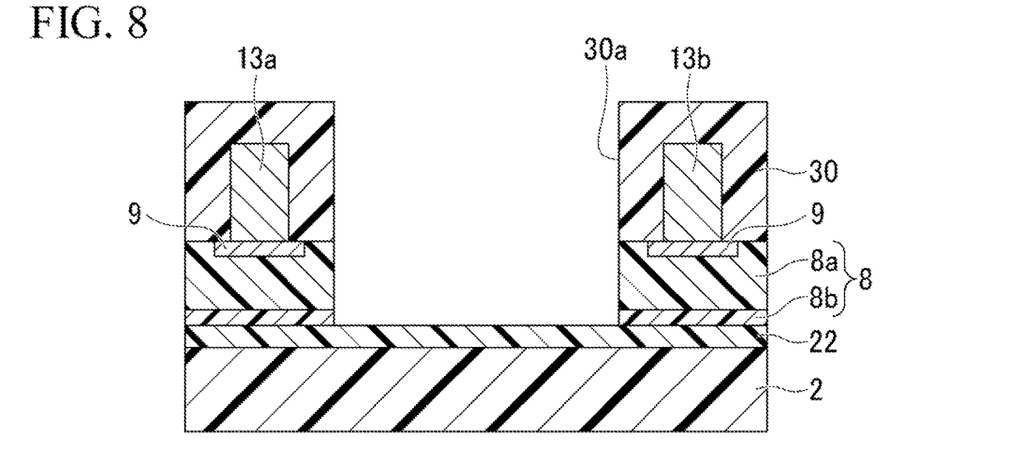
FIG. 8 is a cross-sectional view for sequentially explaining steps of forming the hole in the first insulator layer.

Next, as illustrated in FIG. 8, the aluminum oxide film 8b is removed while being patterned in a shape corresponding to the opening 30a until the antireflection film 22 is exposed using alkaline etching.

Figure 9:
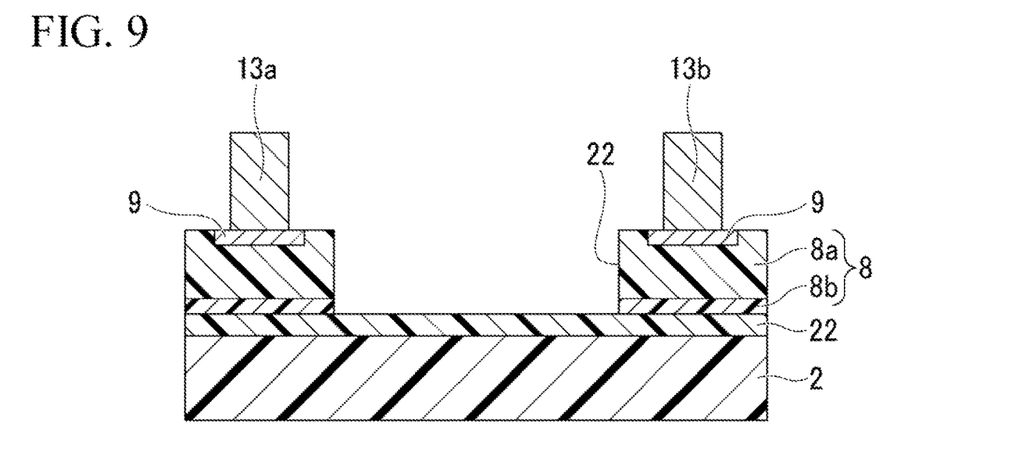
FIG. 9 is a cross-sectional view for sequentially explaining steps of forming the hole in the first insulator layer.

Next, as illustrated in FIG. 9, the mask layer 30 is removed from the surface of the first insulator layer 8. Thereby, the hole 21 can be formed in the first insulator layer 8 with high accuracy.

Third Embodiment

Next, as a third embodiment of the present disclosure, for example, an electromagnetic wave sensor 1C illustrated in FIG. 10 will be described.

Figure 10:
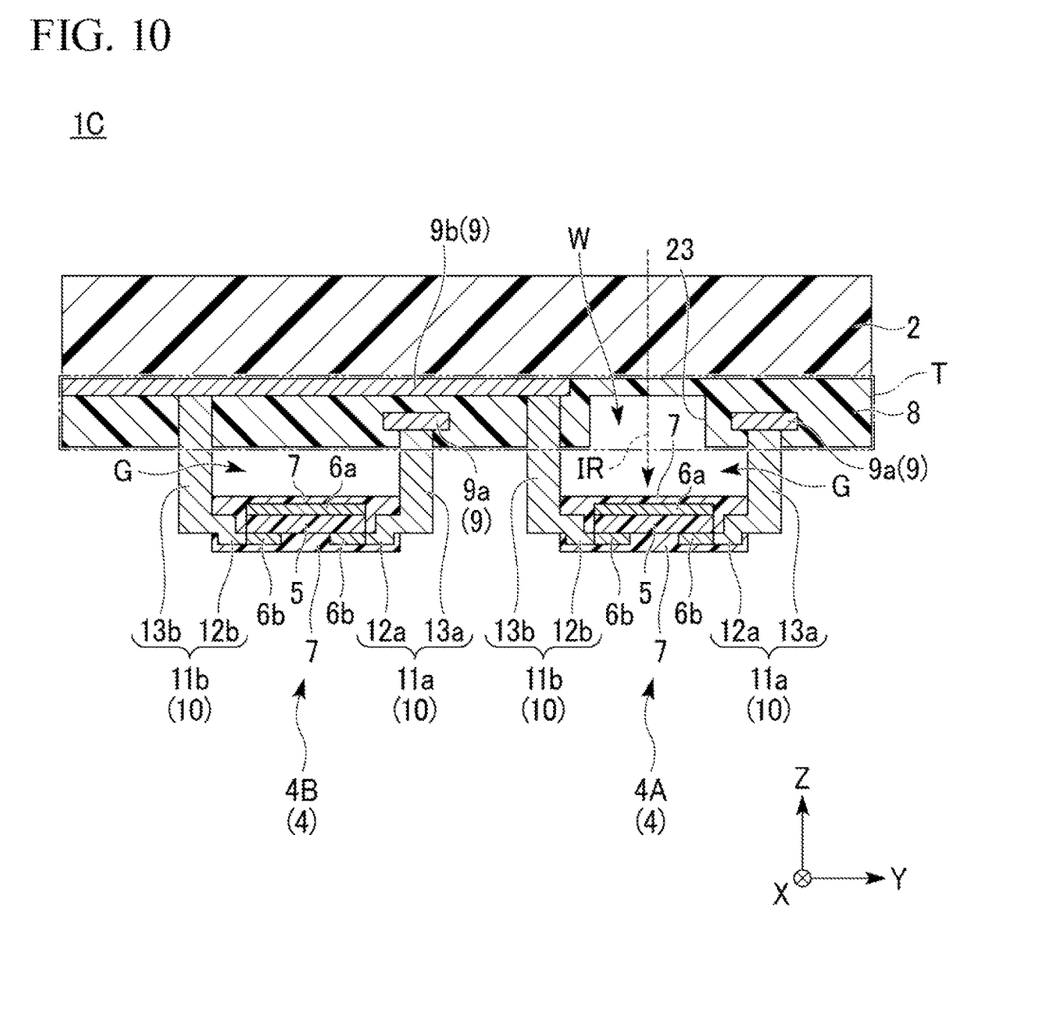
FIG. 10 is a cross-sectional view illustrating a cell structure of an electromagnetic wave sensor according to a third embodiment of the present disclosure.

FIG. 10 is a cross-sectional view illustrating a cell structure of the electromagnetic wave sensor 1C. Also, in the following description, portions the same as those of the above-described electromagnetic wave sensor 1A will be omitted in description and will be denoted by the same reference signs in the drawings.

As illustrated in FIG. 10, the electromagnetic wave sensor 1C of the present embodiment has a configuration in which a recessed part 23 in which the first insulator layer 8 is recessed is provided in a portion facing a thermistor film 5 in a layer T in which the first insulator layer 8 is provided instead of providing the above-described hole 21 penetrating the first insulator layer 8 in a measurement thermistor element 4A. The recessed part 23 is provided between a first substrate 2 and the thermistor film 5.

That is, a transmittance with respect to infrared rays IR at a position at which the recessed part 23 is provided is the highest in the layer T in which the first insulator layer 8 is provided. Configurations other than that are basically the same as those of the electromagnetic wave sensor 1A described above.

Thereby, in the measurement thermistor element 4A, a transmittance with respect to the infrared rays IR at a portion facing the thermistor film 5 is relatively higher than a transmittance with respect to the infrared rays IR at a portion in which a wiring part 9 is provided in the layer T in which the first insulator layer 8 is provided.

Therefore, in the electromagnetic wave sensor 1C of the present embodiment, absorption of the infrared rays IR by portions other than the thermistor film 5 and its vicinity until the infrared rays IR emitted from a measurement target are incident on the vicinity of the thermistor film 5 from the first substrate 2 side through a window portion W in the measurement thermistor element 4A can be reduced to be low.

As described above, in the electromagnetic wave sensor 1C of the present embodiment, an accuracy of detection of the infrared rays IR by the thermistor element 4A described above can be improved, and a temperature distribution (temperature image) of the measurement target can be detected (imaged) with high accuracy.

Fourth Embodiment

Next, as a fourth embodiment of the present disclosure, for example, an electromagnetic wave sensor 1D illustrated in FIG. 11 will be described.

Figure 11:
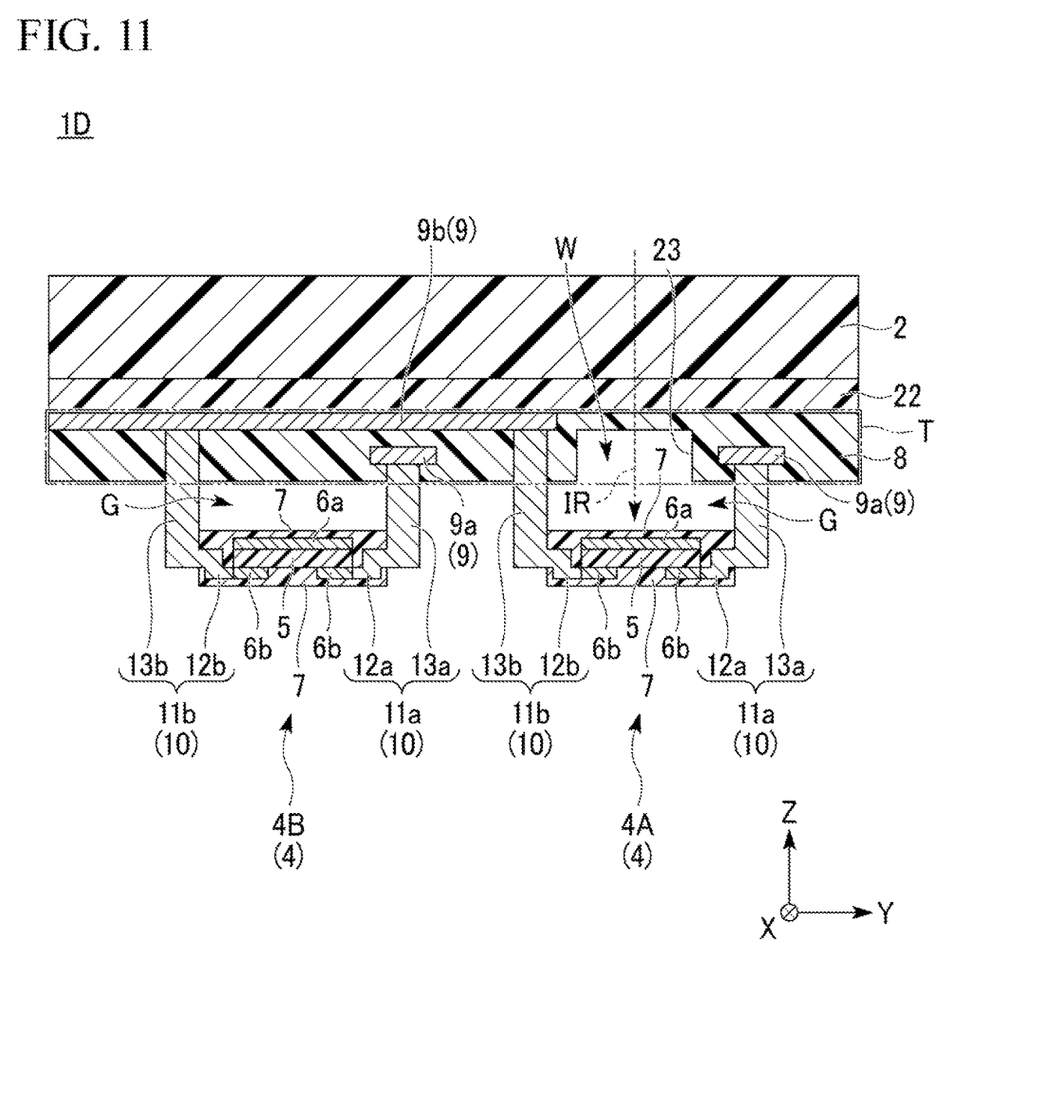
FIG. 11 is a cross-sectional view illustrating a cell structure of an electromagnetic wave sensor according to a fourth embodiment of the present disclosure.

FIG. 11 is a cross-sectional view illustrating a cell structure of the electromagnetic wave sensor 1D. Also, in the following description, portions the same as those of the above-described electromagnetic wave sensors 1B and 1C will be omitted in description and will be denoted by the same reference signs in the drawings.

As illustrated in FIG. 11, the electromagnetic wave sensor 1D of the present embodiment has a configuration in which an antireflection film 22 is provided between a first substrate 2 and a first insulator layer 8. Configurations other than that are basically the same as those of the electromagnetic wave sensor 1C described above.

In the electromagnetic wave sensor 1D of the present embodiment, similarly to the electromagnetic wave sensor 1C, in a measurement thermistor element 4A, a recessed part 23 in which the first insulator layer 8 is recessed is provided in a portion facing a thermistor film 5 in a layer T in which the first insulator layer 8 is provided.

Thereby, in the measurement thermistor element 4A, a transmittance with respect to infrared rays IR at a portion facing the thermistor film 5 is relatively higher than a transmittance with respect to the infrared rays IR at a portion in which a wiring part 9 is provided in the layer T in which the first insulator layer 8 is provided.

Therefore, in the electromagnetic wave sensor 1D of the present embodiment, absorption of the infrared rays IR by portions other than the thermistor film 5 and its vicinity until the infrared rays IR emitted from a measurement target are incident on the vicinity of the thermistor film 5 from the first substrate 2 side through a window portion W in the measurement thermistor element 4A can be reduced to be low.

As described above, in the electromagnetic wave sensor 1D of the present embodiment, an accuracy of detection of the infrared rays IR by the thermistor element 4A described above can be improved, and a temperature distribution (temperature image) of the measurement target can be detected (imaged) with high accuracy.

Fifth Embodiment

Next, as a fifth embodiment of the present disclosure, for example, an electromagnetic wave sensor 1E illustrated in FIG. 12 will be described.

Figure 12:
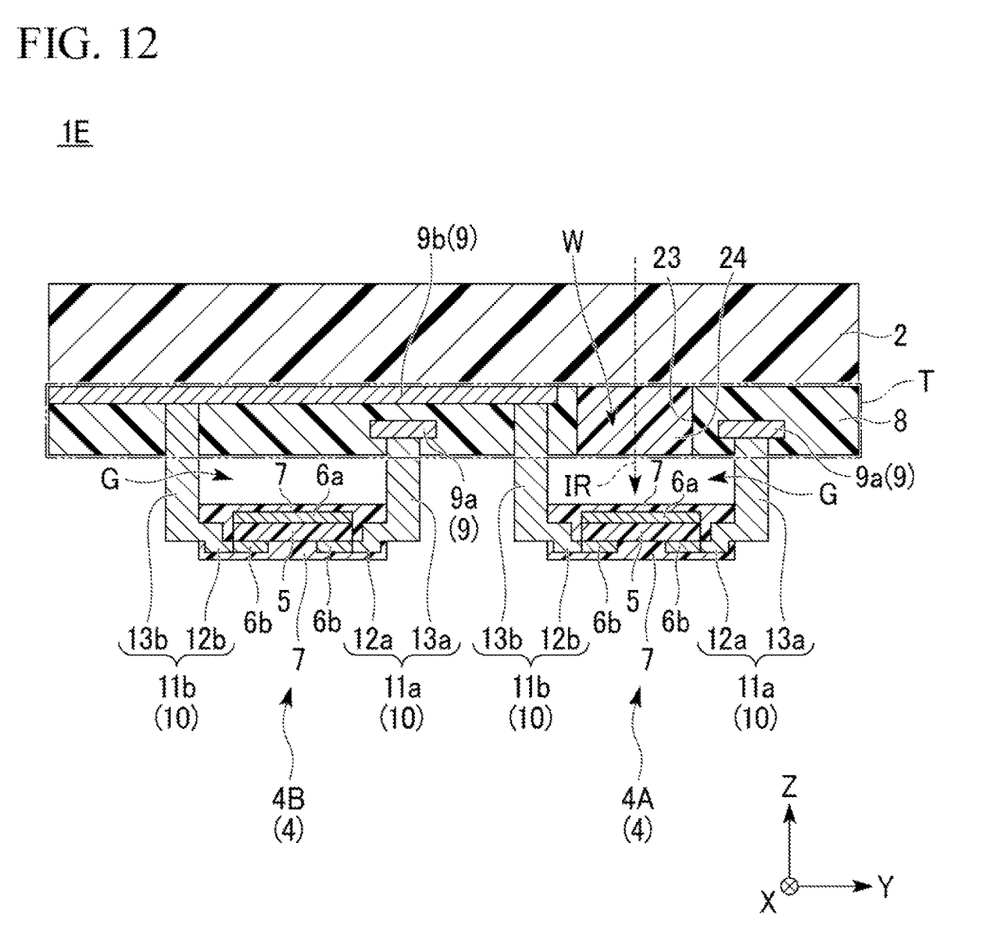
FIG. 12 is a cross-sectional view illustrating a cell structure of an electromagnetic wave sensor according to a fifth embodiment of the present disclosure.

FIG. 12 is a cross-sectional view illustrating a cell structure of the electromagnetic wave sensor 1E. Also, in the following description, portions the same as those of the above-described electromagnetic wave sensor 1A will be omitted in description and will be denoted by the same reference signs in the drawings.

As illustrated in FIG. 12, the electromagnetic wave sensor 1E of the present embodiment has a configuration in which a high transmittance layer 24 is embedded on an inner side of a hole 21 in a measurement thermistor element 4A. Configurations other than that are basically the same as those of the electromagnetic wave sensor 1A described above.

The high transmittance layer 24 is provided in a portion facing a thermistor film 5 in a layer T in which a first insulator layer 8 is provided. The high transmittance layer 24 is a layer having a higher transmittance with respect to infrared rays IR per unit thickness than the first insulator layer 8 of a portion in which a wiring part 9 is provided.

In the measurement thermistor element 4A, a transmittance with respect to the infrared rays IR at a position at which the hole 21 and the high transmittance layer 24 are provided is the highest in the layer T in which the first insulator layer 8 is provided.

Thereby, in the measurement thermistor element 4A, a transmittance with respect to the infrared rays IR at a portion facing the thermistor film 5 is relatively higher than a transmittance with respect to the infrared rays IR at a portion in which the wiring part 9 is provided in the layer T in which the first insulator layer 8 is provided.

Therefore, in the electromagnetic wave sensor 1E of the present embodiment, absorption of the infrared rays IR by portions other than the thermistor film 5 and its vicinity until the infrared rays IR emitted from a measurement target are incident on the vicinity of the thermistor film 5 from the first substrate 2 side through the high transmittance layer 24 in the measurement thermistor element 4A can be reduced to be low.

The high transmittance layer 24 can be caused to function as, for example, an antireflection layer. In this case, as a material of the high transmittance layer 24, zinc sulfide, yttrium fluoride, chalcogenide glass, germanium, silicon, zinc selenide, gallium arsenide, or the like can be used. These materials have a higher transmittance with respect to the infrared rays IR per unit thickness than the materials exemplified in the first insulator layer 8 described above.

When the high transmittance layer 24 functions as an antireflection layer, the infrared rays IR are prevented from being reflected at an interface between the first substrate 2 and a space G until the infrared rays IR emitted from the measurement target are incident on the thermistor film 5 through the high transmittance layer 24, and the infrared rays IR transmitted through the first substrate 2 is efficiently incident on the thermistor film 5 side.

As described above, in the electromagnetic wave sensor 1E of the present embodiment, an accuracy of detection of the infrared rays IR by the thermistor element 4A described above can be improved, and a temperature distribution (temperature image) of the measurement target can be detected (imaged) with high accuracy.

Further, the present disclosure is not necessarily limited to those in the above-described embodiment, and various modifications can be made in a range not departing from the meaning of the present disclosure.

For example, the antireflection film 22 described above may be configured to be provided not only on one surface (a surface facing the second substrate 3) side of the first substrate 2 but also on the other surface (a surface on a side opposite to the surface facing the second substrate 3) side of the first substrate 2.

Also, the reference thermistor element 4B is not necessarily a necessary configuration and may be omitted in some cases.

Further, when only the antireflection film 22 is provided as the first insulator layer 8 described above, it may be difficult to apply a conventional semiconductor process to a process for forming the hole 21 or the recessed part 23 described above depending on a material of the antireflection film 22. Therefore, in the electromagnetic wave sensor 1B of the second embodiment and the electromagnetic wave sensor 1D of the fourth embodiment, it is configured such that the hole 21 or the recessed part 23 is provided in the first insulator layer 8 to which a conventional semiconductor process can be easily applied without providing the hole 21 or the recessed part 23 in the antireflection film 22 described above.

Further, the electromagnetic wave sensor to which the present disclosure is applied is not necessarily limited to the configuration of the infrared image sensor in which the above-described plurality of thermistor elements 4 are disposed in an array, and the present disclosure can also be applied to an electromagnetic wave sensor using the thermistor element 4 alone, an electromagnetic wave sensor in which a plurality of thermistor elements 4 are disposed to be linearly aligned, or the like.

Also, the electromagnetic wave sensor to which the present disclosure is applied is not necessarily limited to one for detecting the above-described infrared rays as electromagnetic waves and may also be one for detecting a terahertz wave having a wavelength of, for example, 30 μm or more and 3 mm or less.

While embodiments of the disclosure have been described and illustrated above, it should be understood that these are exemplary of the disclosure and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. An electromagnetic wave sensor comprising:
   a substrate having transmittance with respect to electromagnetic waves having a specific wavelength;
   an insulator layer provided on one surface side of the substrate;
   a thermistor film disposed to have a vacant space between the thermistor film and one surface of the substrate;
   a wiring part provided inside or on a surface of the insulator layer and electrically connected to the thermistor film; and
   a connecting part which electrically connects the thermistor film and the wiring part,
   wherein the electromagnetic wave sensor is configured so that electromagnetic waves which are emitted from a measurement target transmit through the substrate and are incident on the thermistor film,
   a transmittance of the electromagnetic waves at a portion facing the thermistor film is relatively higher than a transmittance of the electromagnetic waves at a portion where the wiring part is provided in a layer in which the insulator layer is provided,
   the connecting part includes a leg part disposed to extend in a direction of a thickness direction component of the substrate and an arm part disposed at a position not overlapping the thermistor film in a thickness direction of the substrate to have a vacant space between the arm part and the one surface of the substrate,
   the arm part is positioned between the thermistor film and the leg part in the connecting part,
   the leg part is positioned between the wiring part and the arm part in the connecting part,
   a transmittance of the electromagnetic waves at a portion facing the arm part is relatively lower than a transmittance of the electromagnetic waves at a portion facing the thermistor film in the layer in which the insulator layer is provided, and
   the leg part is positioned at a position not overlapping the thermistor film in the thickness direction of the substrate.

2. The electromagnetic wave sensor according to claim 1, wherein an antireflection film is provided between the substrate and the insulator layer.

3. The electromagnetic wave sensor according to claim 1, wherein the insulator layer has a laminated film of a silicon oxide film and an aluminum oxide film provided between the substrate and the silicon oxide film.

4. The electromagnetic wave sensor according to claim 1, further comprising a dielectric film which covers at least some of the thermistor film.

5. The electromagnetic wave sensor according to claim 1, further comprising a reference thermistor film which is different from the thermistor film, wherein
   a transmittance of the electromagnetic waves at a portion facing the thermistor film is relatively higher than a transmittance of the electromagnetic waves at a portion facing the reference thermistor film in the layer in which the insulator layer is provided.

6. The electromagnetic wave sensor according to claim 1, wherein a plurality of thermistor films are disposed in an array.

7. The electromagnetic wave sensor according to claim 1, wherein the insulator layer is thinner where the recessed part is disposed.

8. The electromagnetic wave sensor according to claim 1, wherein the thermistor film is fixed to the substrate by being supported by the leg part and the arm part.

9. An electromagnetic wave sensor comprising:
   a substrate having transmittance with respect to electromagnetic waves having a specific wavelength;
   an insulator layer provided on one surface side of the substrate;
   a thermistor film disposed to have a vacant space between the thermistor film and one surface of the substrate;
   a wiring part provided inside or on a surface of the insulator layer and electrically connected to the thermistor film; and
   a connecting part which electrically connects the thermistor film and the wiring part,
   wherein the electromagnetic wave sensor is configured so that electromagnetic waves which are emitted from a measurement target transmit through the substrate and are incident on the thermistor film,
   a hole penetrating the insulator layer or a recessed part in which the insulator layer is recessed is provided between the substrate and the thermistor film,
   the connecting part includes a leg part disposed to extend in a direction of a thickness direction component of the substrate and an arm part disposed at a position not overlapping the thermistor film in a thickness direction of the substrate to have a vacant space between the arm part and the one surface of the substrate,
   the arm part is positioned between the thermistor film and the leg part in the connecting part,
   the leg part is positioned between the wiring part and the arm part in the connecting part, and the leg part is positioned at a position not overlapping the thermistor film in the thickness direction of the substrate.

10. The electromagnetic wave sensor according to claim 9, wherein a plurality of thermistor films are disposed in an array.

11. The electromagnetic wave sensor according to claim 9, wherein the thermistor film is fixed to the substrate by being supported by the leg part and the arm part.

* * * * *